Aug. 20, 1968 E. T. SULLIVAN 3,398,231

LIQUID COOLING OF OPPOSITELY CHARGED CONDUCTIVE MEMBERS WITH ELONGATED INSULATED COOLANT PASSAGE BETWEEN

Filed Aug. 18, 1964 2 Sheets-Sheet 1

INVENTOR
EDMUND T. SULLIVAN
BY Edmund W Bopp
AGENT

INVENTOR
EDMUND T. SULLIVAN
BY Edmund W Bopp
AGENT

United States Patent Office 3,398,231
Patented Aug. 20, 1968

3,398,231

LIQUID COOLING OF OPPOSITELY CHARGED CONDUCTIVE MEMBERS WITH ELONGATED INSULATED COOLANT PASSAGE BETWEEN

Edmund T. Sullivan, Jersey City, N.J., assignor to Air Reduction Company, Incorporated, New York, N.Y., a corporation of New York Filed Aug. 18, 1964, Ser. No. 390,300
2 Claims. (Cl. 174—15)

ABSTRACT OF THE DISCLOSURE

A cooling system for electrical apparatus wherein the cooling stream, e.g. water, is in contact with electrically conductive apparatus parts having a voltage differential therebetween. A shaped insulating means is positioned between said parts and provides a passage for the resultant electrically conductive cooling stream, said passage being of sufficient length to substantially reduce the effects of electrolysis. The insulating means further provides a liquid tight seal with the conductive parts for containment of the cooling stream.

This invention relates to liquid cooling systems for equipment including oppositely charged electrically conductive members to be cooled, and more particularly to the elimination of deleterious effects of electrolysis in such equipment.

While the invention will be described and shown with special reference to a welding gun, it will be evident that the invention may also be applied to other kinds of equipment in which liquid cooling is desired and in which electrolysis may occur due to the interposition of a more or less conductive liquid coolant between the oppositely charged conductive members to be cooled.

An object of the invention is to substantially eliminate the deleterious effects of electrolysis in a liquid cooling system in which two oppositely charged conductive members are to be cooled by the same stream of liquid coolant.

A related object is to increase the effective length of electrically conductive path through the cooling stream betwen the oppositely charged conductive members in order to reduce electrolytic currents in the stream to negligible proportions.

A feature of the invention is the guiding of the cooling stream so that it is brought into thermal contact first solely with one of the conductive members to be cooled in one portion of the path followed by the stream, and thereafter is brought into thermal contact solely with the other of the conductive members in another portion of the path.

A related feature is the introduction of a relatively long fully insulated path portion for guiding the cooling stream between the regions in which the stream is in thermal contact with one or the other of the conductive members to be cooled.

Another feature is a unitary structure of a combined liquid seal and conduit member including built-in equivalents of O-ring type seals.

A further feature is a combined seal and conduit member having conical surfaces placed between opposing conical matching surfaces of members to be cooled, whereby the said combined seal and conduit member can be more effectively compressed between said members to be cooled, while providing convenient access from said members to passages in said conduit member.

In one embodiment of the invention that has been made and successfully operated, the combined seal and conduit member is an elongated unitary molded insulating member having a plurality of tubular axial passages for coolant.

Other objects, features and advantages will appear from the following more detailed description of illustrative embodiments of the invention, which will now be given in conjunction with the accompanying drawings.

Figure 1:
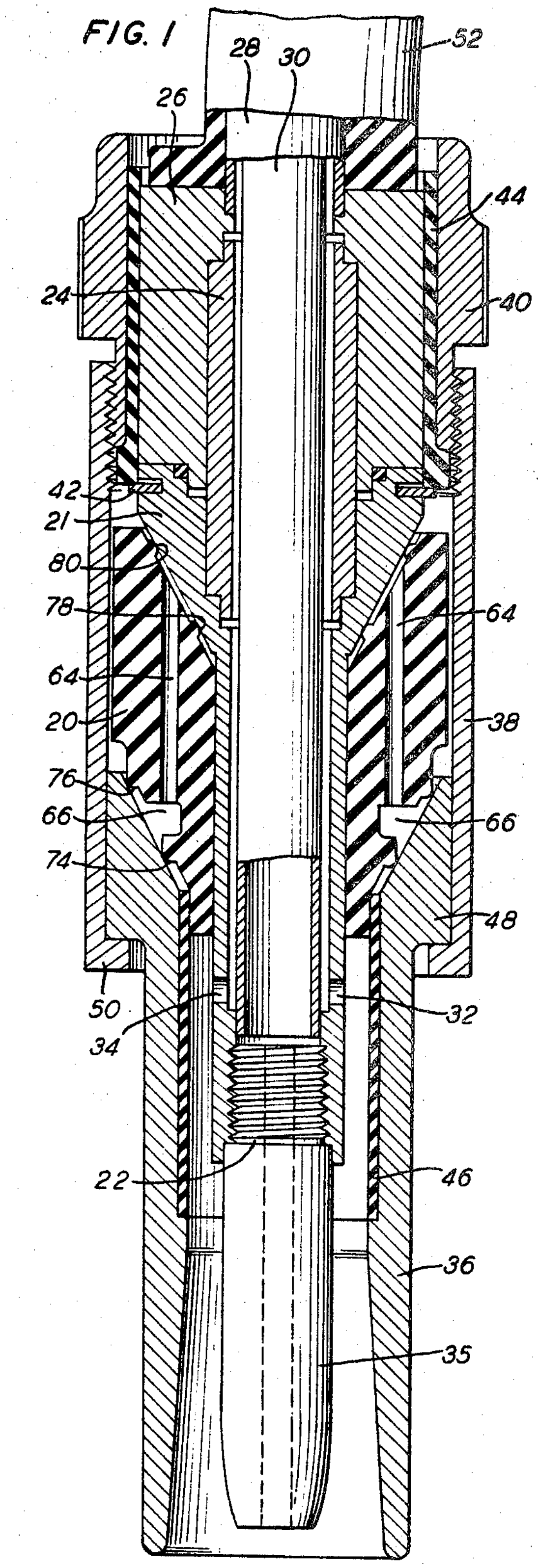
FIG. 1 is a longitudinal sectional view of a welding gun embodying the invention.

Referring to the drawings, there are shown certain barrel and nozzle portions of a welding gun, between which portions is clamped a combined seal and insulated conduit member 20 for conveying coolant fluid between a region of thermal contact with the barrel portion and a region of thermal contact with the nozzle portion, over an elongated path.

The barrel portion of the welding gun comprises an elongated contact member 21 having a socket 22 at the end thereof which is shown as threaded internally to receive a welding-wire contact tip 35. The member 21 is hollow with a bell-shaped flare at the end opposite from the socket 22. Into the flared end of the member 21 there is fitted a coolant channel divider 24, over which in turn is fitted a coolant inlet member 26. In an axial socket in the member 26 there is fastened a shielding gas conduit 28 within which passes a guide tube 30 for welding wire, extending within the members 26, 24 and 21. Clearance space surrounding the member 30 within the members 26, 24 and 21 forms an extension of the gas conduit 28 leading to a plurality of vent holes of which two are shown at 32 and 34 in the member 21. Through the plurality of vent holes the shielding gas can enter the nozzle portion of the gun, which portion will next be described.

The nozzle portion of the gun comprises the nozzle proper 36, a retaining nut 38 and a lock screw member 40, all three of which are in electrical contact with one another and are subject to being grounded when the nozzle touches the workpiece, in which case the full potential of the welding power source is impressed between the nozzle assembly and the welding current carrying parts of the gun. In some cases this will happen only occasionally or accidentally while in other cases the nozzle may regularly touch the workpiece during the welding operation.

In the assembling of the gun in the form shown, the parts 21, 24, 26, 28, 30, 54 and 56 are preferably formed into a unit, as by soldering them together. These parts serve as a conductor for welding current. The sheath 52 is formed of electrical insulating material, preferably molded over the parts 28, 54 and 56, to protect the operator from the electrically charged parts which carry the welding current. An insulating sleeve 44 is inserted within the lock screw member 40, the two parts as a unit are slid over the member 26, and held in place by snapping a retaining ring 42 into a groove provided for it in the member 21.

An insulating sleeve 46 is inserted within the nozzle member 36 and these members as a unit are inserted within the retaining nut 38. The combined seal and coolant conduit member 20 is slid over the member 21. The retaining nut 38 is then threadedly engaged with the lock screw member 40. The contact tip 35 may be screwed into the socket 22 either before or after the assembling of the gun is completed.

The tightening of the engagement between the retaining nut 38 and the lock screw assembly 40 compresses the member 20 between an internally conical surface of the nozzle member 36 and an externally conical surface of the member 21, which latter member is pressed in turn against the retaining ring 42, compressing a portion of the sleeve 44 between the retaining ring 42 and a shoulder of the lock screw member 40.

Figure 2:
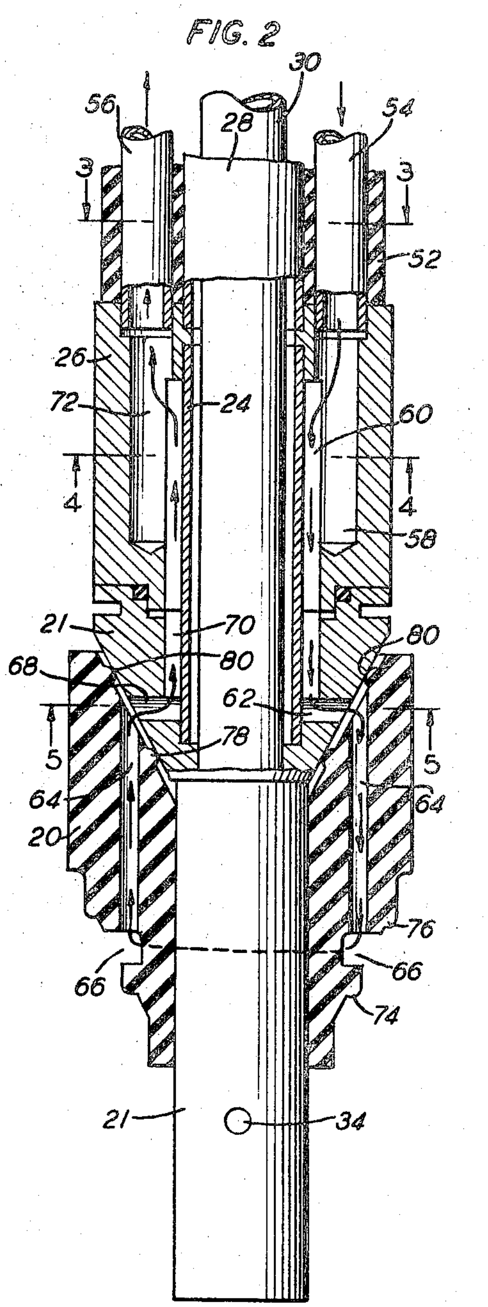
FIG. 2 is a partial longitudinal sectional view of the gun shown in FIG. 1, taken at right angles to the section shown in FIG. 1.
Figure 3:
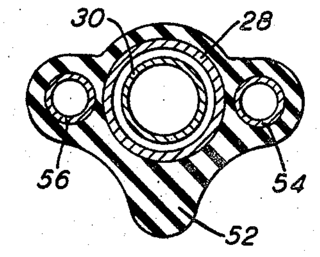
FIG. 3 is a cross sectional view taken along the line 3′—3′ in FIG. 2.
Figure 4:
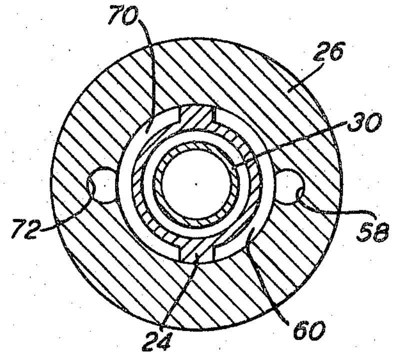
FIG. 4 is a cross sectional view taken along the line 4′—4′ in FIG. 2.
Figure 5:
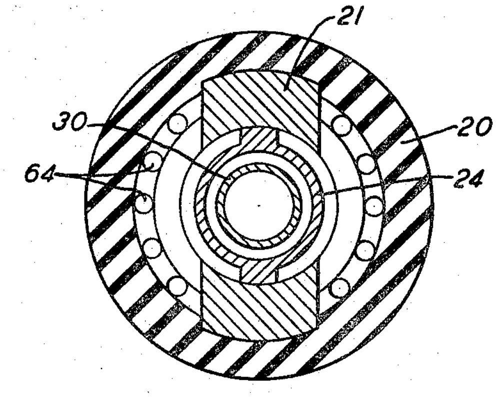
FIG. 5 is a cross sectional view taken along the line 5′—5′ in FIG. 2.
Figure 6:
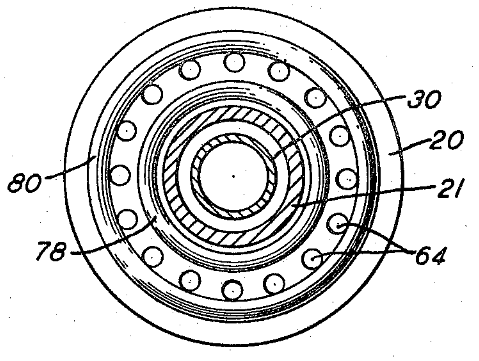
FIG. 6 is a plan view of a combined insulating seal and coolant conduit member shown in section in FIGS. 1, 2 and 5.

The coolant, shielding gas and welding current are supplied to the barrel portion of the gun through their respective conduits which are enclosed in the sheath 52. The coolant inlet conduit is designated 54 (FIG. 2) and enters a hole drilled in the member 26 which opens into a coolant inlet supply passage 58, which in turn opens into an inlet barrel cooling passage 60 which extends a little less than half way around the circumference of the channel dividing member 24. The passage 60 opens into a transverse slot 62 in the externally conical surface of the number 21.

The combined seal and coolant passage member 20 is annular in shape, preferably with an externally conical surface at one end as shown, matching the internally conical surface of the nozzle 36, and preferably with an internally conical surface at the other end as shown, matching the externally conical surface of the electrical contact member 21. The member 20 has a plurality of axial passages 64 for coolant. Several of the passages 64 are open to the slot 62 and serve to pass coolant from the slot 62 to an annular groove 66 near the end of the member 20 nearer to the socket 22. Coolant circulates circumferentially in slot 66 and enters others of the axial passages 64 through which it reaches another transverse slot 68 in the member 21. The slot 68 opens into an outlet barrel cooling passage 70 extending a little less than halfway around the circumference of the channel dividing member 24, which member 24 serves to isolate passage 60 from passage 70. The passage 70 opens into a coolant outlet passage 72. The coolant outlet conduit 56 is fastened in a hole drilled in the member 26 and opens into the coolant outlet passage 72.

The combined seal and insulator 20 is preferably molded in a single piece from a substance such as a rubber compound. The axial passages in this member are preferably fairly numerous and closely spaced, and for ease of manufacture and assembly the member may well have passages all the way around the circumference of its annular form. It will be noted that a few of the axial passages are at least partially obstructed by the unslotted portion of the conical portion of member 21 and are not operative. If the inoperative passages were to be omitted, it would be necessary to orient the member 20 during assembly in such angular position to make the passages register with the slots 62 and 68. This necessity is obviated by providing passages all around the circumference. The inoperative passages do no harm and the coolant which reaches the partially covered passages is under pressure that is equalized at the two ends of the passage so that no circulation results.

The member 20 preferably includes on its outer surface as shown, unitary O-ring seals formed in molding the member. The O-ring seals 74 and 76 serve to seal off the annular passage 66 between the member 20 and the nozzle 36. The O-ring seals 78 and 80 serve to seal off the passage 62 between the member 20 and the member 21, and also the passage 68 between the member 20 and the member 21.

A suitable molding material for making the sealing and insulating member 20 is obtainable from the Minnesota Rubber Company, Minneapolis, Minn., under the designation "Compound 559," having a durometer rating of 70.

The coolant in the passage 60 is in electrical contact with the electrically charged members 24 and 21. The coolant in the passage 66 is in electrical contact with the nozzle 36 which is grounded when in contact with the workpiece that is being welded. The electrical path through the coolant is extended by the design of the member 20 so that it is substantially equal to the axial length of any one of the axial passages 64.

With the usual available water as a coolant, it has been found that an axial passage length of three-quarters to one inch is sufficient to avoid deleterious effects of electrolysis in the cooling water. Resort to the use of distilled water is not necessary. This is in contrast to the usual design of water cooling passages in a welding gun where commonly the cooling water passes between metal surfaces as close together as one-quarter inch with the full welding potential between the metal surfaces, in which case noticeable and excessive corrosion is observed during normal welding operation, requiring expensive scrapping of apparatus parts.

While illustrative forms of apparatus and methods in accordance with the invention have been described and shown herein, it will be understood that numerous changes may be made without departing from the general principles and scope of the invention.

I claim:

1. In a liquid cooled electrically charged system, in combination, first and second coaxially arranged electrically charged members spaced apart along a common axis, said members having opposed conical surfaces, and insulating liquid conduit means having conical faces adjacent respective conical surfaces of said charged members, said insulating means being clamped between said charged members with at least a portion of each face being in liquid sealing contact with its adjacent surface and said means defiining an insulated passage for receiving a cooling stream passing from thermal and electrical contact with one charged member to thermal and electrical contact with the other of said charged members, said passage being of sufficient length to substantially eliminate the deleterious effects of electrolytic action of the cooling stream on said charged members.

2. In a liquid cooled electrically charged system, in combination, first and second electrically charged members coaxially arranged and spaced apart along their common axis, means conducting a stream of cooling liquid into thermal and electrical contact with said first charged member, an insulating member clamped between said first and second charged members and defining a passage for conducting said stream of cooling liquid from contact with said first charged member into thermal and electrical contact with said second charged member, said insulating member comprising a body of resilient material compressed between said first and second charged members and forming a liquid seal with each of said charged members, said passage being of sufficient length to substantially eliminate the deleterious effects of electrolytic action of the cooling stream on said charged members.

References Cited

UNITED STATES PATENTS

| | | | |
|---|---|---|---|
| 2,806,125 | 9/1957 | Miller | 219—130 |
| 2,960,594 | 11/1960 | Thorpe | 219—21 X |
| 3,048,691 | 8/1962 | Longstreth | 219—130 |

RICHARD M. WOOD, *Primary Examiner.*

J. G. SMITH, *Assistant Examiner.*